US009990215B2

(12) United States Patent
Wong et al.

(10) Patent No.: US 9,990,215 B2
(45) Date of Patent: Jun. 5, 2018

(54) USER INTERFACE FOR MANAGING A VIRTUALIZED COMPUTING ENVIRONMENT

(75) Inventors: Karen Natalie Wong, San Carlos, CA (US); Kathryn Murrell, San Francisco, CA (US); Manaswi Shukla, San Bruno, CA (US)

(73) Assignee: VMware, Inc., Palo Alto, CA (US)

( * ) Notice: Subject to any disclaimer, the term of this patent is extended or adjusted under 35 U.S.C. 154(b) by 1240 days.

(21) Appl. No.: 13/031,752

(22) Filed: Feb. 22, 2011

(65) Prior Publication Data
US 2012/0216135 A1 Aug. 23, 2012

(51) Int. Cl.
*G06F 3/048* (2013.01)
*G06F 9/455* (2018.01)

(52) U.S. Cl.
CPC ...... *G06F 9/45533* (2013.01); *G06F 9/45508* (2013.01)

(58) Field of Classification Search
CPC ........... G06F 17/2247; G06F 17/30011; G06F 17/30274; G06F 17/30637; G06F 17/30675; G06F 17/3089; G06F 17/30994
See application file for complete search history.

(56) References Cited

U.S. PATENT DOCUMENTS

| | | | | |
|---|---|---|---|---|
| 5,999,179 A | * | 12/1999 | Kekic | H04L 41/0213 715/734 |
| 2004/0098422 A1 | * | 5/2004 | Levesque | H04L 41/20 |
| 2005/0219151 A1 | * | 10/2005 | Li | H04L 41/22 345/7 |
| 2006/0017969 A1 | * | 1/2006 | Ly | G06F 3/1204 358/1.15 |
| 2009/0006543 A1 | * | 1/2009 | Smit | G06F 17/30864 709/203 |
| 2009/0092113 A1 | * | 4/2009 | Doshi | H04W 24/04 370/338 |
| 2010/0100253 A1 | * | 4/2010 | Fausak | G01D 4/002 700/295 |
| 2010/0122175 A1 | * | 5/2010 | Gupta | H04L 41/22 715/735 |
| 2010/0274366 A1 | * | 10/2010 | Fata | G05B 15/02 700/7 |
| 2011/0167421 A1 | * | 7/2011 | Soundararajan | G06F 9/5077 718/1 |
| 2012/0078869 A1 | * | 3/2012 | Bellville et al. | 707/706 |
| 2012/0089981 A1 | * | 4/2012 | Tripathi | G06F 9/4818 718/1 |

(Continued)

*Primary Examiner* — Linh K Pham
(74) *Attorney, Agent, or Firm* — Clayton, McKay & Bailey, PC

(57) ABSTRACT

A virtualized computing environment is managed with a user interface that includes a graphical interface portion as well as a command-line portion. As a user interacts with the graphical interface portion, a command-line entry corresponding to the interaction is automatically generated and populates the command-line portion. Similarly, as the user types in a command-line entry, a corresponding action is graphically depicted in the graphical interface portion. By providing a blend of a graphical interface and a command-line interface, embodiments of the invention provide improved usability of the virtual infrastructure client and allow users to more quickly become familiar with the use of the application.

12 Claims, 13 Drawing Sheets

(56) References Cited

U.S. PATENT DOCUMENTS

2012/0106354 A1* 5/2012 Pleshek .................. H04L 43/12
370/241
2013/0212580 A1* 8/2013 Glaser ................ G06F 9/45558
718/1

* cited by examiner

USER INTERFACE FOR MANAGING A VIRTUALIZED COMPUTING ENVIRONMENT

BACKGROUND

Computer virtualization is a technique that involves encapsulating a physical computing machine platform into a virtual machine that is executed under the control of virtualization software running on a single hardware computing platform (also referred to herein as "host system" or "host computer"). A group of hardware computing platforms may be organized as a cluster to provide the hardware resources for virtual machines. In a data center that employs virtual machines, it is common to see hundreds, even thousands, of virtual machines running on multiple clusters of host systems.

Virtualization management software is used by an administrator to manage the configuration of the virtual machines and the allocation of computing resources to the virtual machines. Because of the large number of virtual machines to be managed within a single data center, and sometimes, across multiple data centers, some of the administrator's tasks are automated. For example, software automated techniques such as dynamic resource scheduling and dynamic power management have been developed to assist the administrator in balancing workloads across host systems and powering host systems ON and OFF as needed.

The virtualization management software includes one or more interfaces, including various graphical user interfaces (GUIs) and command line interfaces (CLIs), by which the administrator manages the virtualized computing environment. The GUIs are easier to use but have limited functionality. In essence, they restrict the actions that the administrator may be able to perform to what is exposed by the GUI. CLIs, on the other hand, provide much greater flexibility in that they expose the entire API (Application Programming Interface) to the user. Learning to use the CLI is, however, difficult. Moreover, executing commands with the CLI can be risky and error-prone.

Accordingly, there remains a need in the art for a user interface for managing a virtualized computing environment that addresses the drawbacks and limitations discussed above.

SUMMARY

One or more embodiments of the invention provide a user interface for managing a virtualized computing environment. This user interface includes a graphical interface portion as well as a command-line portion. As a user interacts with the graphical interface portion, a command-line entry corresponding to the interaction is automatically generated and populates the command-line portion. Similarly, as the user types in a command-line entry, a corresponding action is graphically depicted in the graphical interface portion. By providing a blend of a graphical interface and a command-line interface, embodiments of the invention provide improved usability of the virtual infrastructure client and allow users to more quickly become familiar with the use of the application.

One embodiment provides a technique for managing distributed computing resources in a virtualized computing environment includes receiving user input via a graphical interface of a virtual infrastructure management application; determining a textual command corresponding to the user input received via the graphical interface; and displaying the textual command in a command line interface of the virtual infrastructure management application.

Another embodiment of the invention provides a technique for managing distributed computing resources in a virtualized computing environment, including receiving user input via a command line interface of a virtual infrastructure management application; determining a graphical representation corresponding to the user input received via the command line interface; and displaying the graphical representation in a graphical interface portion of the virtual infrastructure management application.

BRIEF DESCRIPTION OF THE DRAWINGS

FIGS. 7A, 7B and 7C depict screenshots of a logic builder, according to embodiments of the invention.

FIGS. 8A, 8B and 8C depict screenshots of script management techniques, according to embodiments of the invention.

DETAILED DESCRIPTION

Figure 1A:
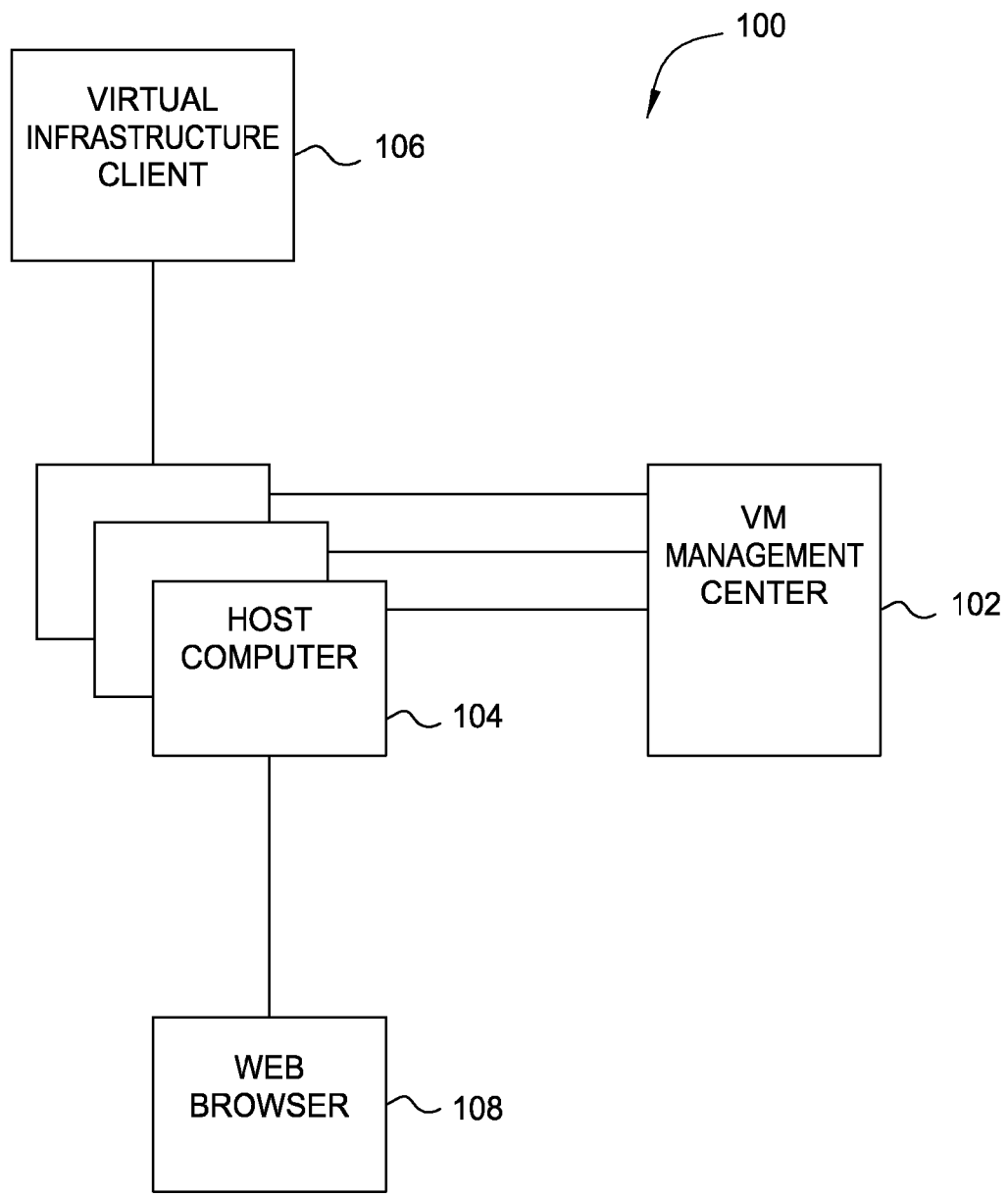
FIG. 1A depicts a block diagram of a virtualized computer system in which one or more embodiments of the present invention may be practiced.

FIG. 1A depicts a block diagram of a virtualized computer system 100 in which one or more embodiments of the present invention may be practiced. Host computers 104 (also referred to herein as "servers") are configured to deliver virtualization-based distributed services to information technology environments. Each host computer 104 provides a virtualization layer that abstracts processor, memory, storage, and/or networking resources into multiple virtual machines that run side-by-side on the same physical host computer 104. In one embodiment, virtualization software can be installed directly on the server hardware and inserts a virtualization layer between the hardware and the operating system. The virtualization software partitions a physical host computer 104 into multiple secure and portable virtual machines that run on the same physical server. Each virtual machine represents a complete system—with processors, memory, networking, storage, and/or BIOS.

A virtual machine (VM) management center 102 is also included in the system 100. The VM management center 102 manages the virtual infrastructure, including managing the host computers 104, the virtual machines running within each host computer 104, provisioning, migration, resource allocations, and so on.

According to various embodiments, implementing a virtualized system simplifies management with a management application, such as the Virtual Infrastructure (VI) Client 106, that can be used to perform tasks. Each server configuration task, such as configuring storage and network connections or managing the service console, can be accomplished centrally through the VI Client 106. One embodiment provides a stand-alone application version of the VI Client 106. In another embodiment, a web browser application 108 provides virtual machine management access from any networked device. For example, with the browser version of the client 108, giving a user access to a virtual machine can be as simple as providing a URL (Uniform Resource Locator) to the user.

According to some embodiments, user access controls of the VM management center 102 provide customizable roles and permissions so an administrator can create roles for various users by selecting from an extensive list of permissions to grant to each role. Responsibilities for specific virtualized infrastructure components, such as resource pools, can be delegated based on business organization or ownership. VM management center 102 can also provide full audit tracking to provide a detailed record of every action and operation performed on the virtual infrastructure. As described in greater detail herein, embodiments of the invention provide a user interface for the VI Client 106 that includes a graphical portion and a command-line portion.

Figure 1B:
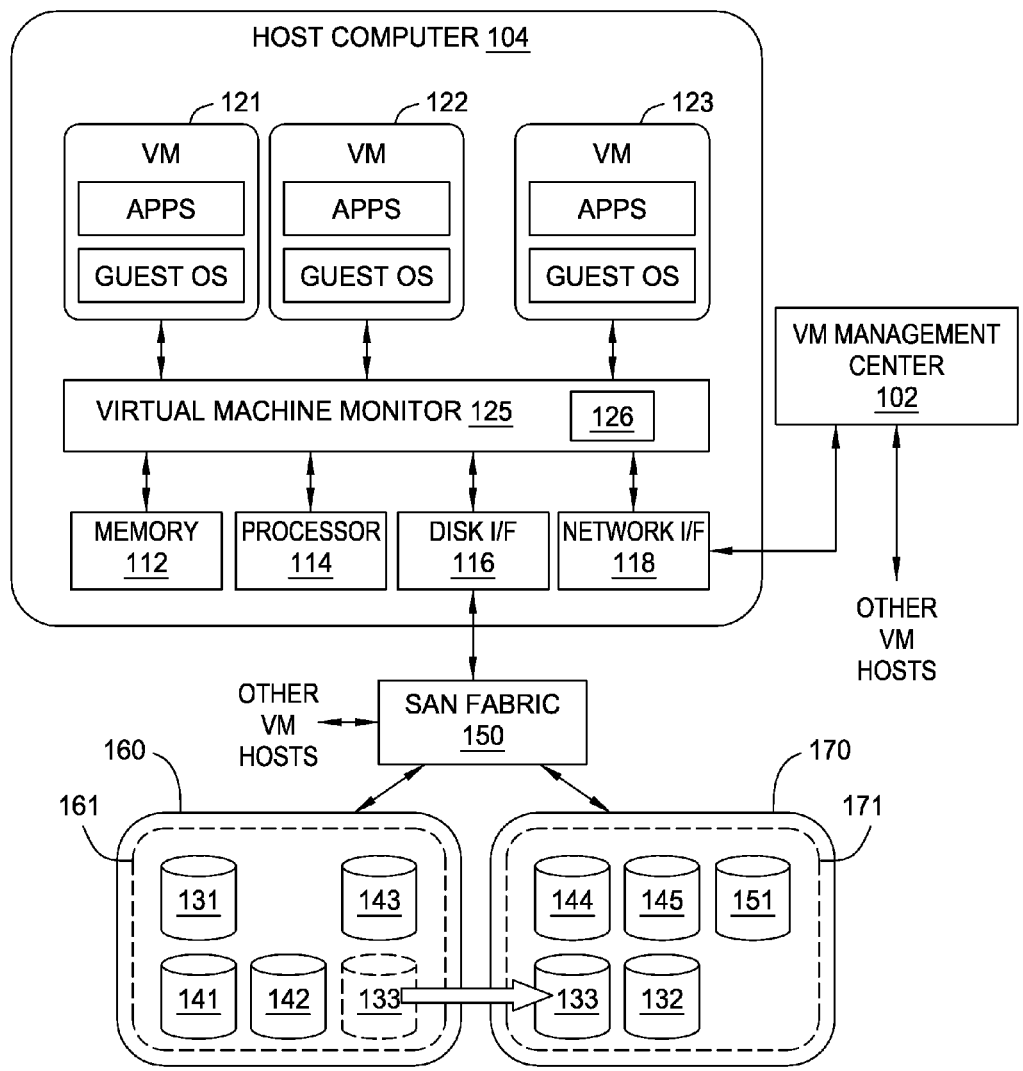
FIG. 1B depicts a block diagram of a host computer and virtual machine (VM) management center, according to one embodiment of the invention.

FIG. 1B depicts a block diagram of a host computer 104 and VM management center 102, according to one embodiment of the invention. A virtualized environment includes a host computer 104 that has conventional components of a computing device, and may be implemented within a cluster of computing devices. One or more virtual machines are configured within the host computer 104, represented in FIG. 1B as VM 121, VM 122, and VM 123, that share hardware resources of host computer 104, such as system memory 112, processor 114, disk interface 116, and network interface 118. Examples of disk interface 116 are a host bus adapter and a network file system interface. An example of network interface 118 is a network adapter.

The virtual machines VM 121-123 run on top of a virtual machine monitor 125, which is a software interface layer that enables sharing of the hardware resources of host computer 104 by the virtual machines. Virtual machine monitor 125 may run on top of the operating system of the host computer 104 or directly on hardware components of the host computer 104. In some embodiments, virtual machine monitor 125 runs on top of a hypervisor that is installed on top of the hardware resources of host computer 104. Together, the virtual machines 121-123 and virtual machine monitor 125 create virtualized computer systems that give the appearance of being distinct from host computer 104 and from each other. Each virtual machine includes a guest operating system and one or more guest applications. The guest operating system is a master control program of the virtual machine and, among other things, the guest operating system forms a software platform on top of which the guest applications run.

In one embodiment, data storage for host computer 104 is served by a storage area network (SAN), which includes a storage array 160 (e.g., a disk array), a storage array 170 (e.g., a disk array), and a switch (SAN fabric) 150 that connects host computer 104 to storage array 160 and storage array 170. Switch 150, illustrated in the embodiment of FIG. 1B, is a SAN fabric switch, but other types of switches may be used. As illustrated, switch 150 is further connected to virtual machine host computers, other than host computer 104, whose files are also stored in storage array 160, and storage array 170. Typically, storage array 160 and storage array 170 are exposed to the host computers as logical unit numbers (LUNs), and there is a mapping between each LUN and physical devices, such as disk drives, in the storage arrays. In certain embodiments disclosed herein, it is assumed that there is a one-to-one correspondence between the LUNs and the storage arrays, such that storage array 160 is LUN 161 and storage array 170 is LUN 171. However, embodiments of the invention are applicable to storage array configurations where the correspondence between the LUNs and the storage arrays is not one-to-one. Distributed storage systems other than SAN systems may also be used. For example, a network attached storage (NAS) system configured to expose a file system volume to clients may also be used.

In the embodiment illustrated in FIG. 1B, LUN 161 includes disk images of four virtual machines and LUN 171 includes disk images of five virtual machines. VM 121 running in host computer 104 has a disk image 131 stored in LUN 161, and VM 122 running in host computer 104 has a disk image 132 stored in LUN 171. Disk image 133, which is the disk image corresponding to VM 123 running in host computer 104, is illustrated in dashed lines because it has been migrated to LUN 171. Disk images 141, 142, 143, 144, 145, 151 are disk images of virtual machines running in other virtual machine host computers. Disk images 141, 142, 143 are stored in LUN 161, and disk images 144, 145, 151 are stored in LUN 171.

A software component 126 is implemented inside virtual machine monitor 125 to monitor input-output operations (I/Os) of the virtual machines. Alternatively, software component 126 may be implemented in the file system layer of the hypervisor. One example of software component 126 is the vscsiStats utility that is available from VMware Inc. Software component 126 generates histograms for the following parameters: (1) seek distance or randomness, which is a measure of the spatial locality in the workload measured as the minimum distance in terms of sectors or logical block numbers from among the last k number of I/Os, a small distance signifying high locality; (2) I/O data length, represented in different bins of size 512 Bytes, 1 KB, 2 KB, etc.; (3) outstanding I/Os, denoting the queue length that virtual machine monitor 125 sees from a virtual machine; (4) I/O rate; (5) I/O latency, which is measured for each IO from the time it gets issued by the virtual machine until the virtual machine is interrupted for its completion; and (6) read/write ratio, which is a measure of number of read requests in relation to write requests. The histograms may be collected on a per virtual machine basis, a per virtual-disk basis (e.g., in cases where a single VM has multiple virtual disks), or any other technically feasible basis.

In virtualized computer systems, in which disk images of virtual machines are stored in the storage arrays, disk images of virtual machines can be migrated between storage arrays as a way to balance the loads across the storage arrays. For example, the Storage VMotion™ product that is available from VMware Inc. of Palo Alto, Calif. allows disk images of virtual machines to be migrated between storage arrays without interrupting the virtual machine whose disk image is being migrated or any applications running inside it.

A distributed storage system employs multiple storage arrays and serves multiple client computers over a network. In such a system, loads on the storage arrays can vary as demands from the client computers fluctuate. To optimize performance of the storage arrays, loads on the multiple storage arrays are observed and balanced when they become uneven.

In other embodiments, any technically feasible data storage implementation, other than a SAN, can be used to provide storage resources for host computer 104.

As described, disk images of virtual machines can be migrated between storage arrays as a way to balance the loads across the storage arrays. Similarly, VMs can be migrated between different host computers.

According to some embodiments, the VI Client 106 can include a user interface for managing the virtualized computing environment. Conventional graphical user interfaces (GUIs) can be complex and difficult for a novice user to learn to use. In addition, users of a conventional VI Client GUI are limited by the controls that that the GUI developers have decided are most important to provide from the APIs (Application Programming Interfaces) of the virtualized computing environment. Only exposing a portion of the API limits the flexibility and efficiency of the user's ability to manage their virtual infrastructure.

To overcome the limitations of a purely graphical interface, some users learn to script and execute commands independent of the options provided in the GUI. This is typically done outside of the client using a third-party scripting application, is not optimized to work with the client, and can be extremely difficult to learn.

While the GUI is helpful for beginners unfamiliar with the capabilities of the client or the organizational relationships in the virtual environment by enabling visualizations of the relationships, the command-line interface is extremely useful for fast and frequent commands, which is useful for very quickly executing frequently used commands. The command-line interface also provides the freedom and flexibility to script or call upon any functions available in the API. In some embodiment, scripting provides several benefits, including providing consistency (i.e., the ability to repeat a sequence of commands for similar configurations) and allowing an audit trail.

Embodiments of the invention provide an integrated user interface for a virtual infrastructure management application that includes a graphical interface portion as well as a command-line portion. As a user interacts with the graphical interface portion, a command-line entry corresponding to the interaction is automatically generated and populates the command-line portion. Similarly, as the user types in the command-line interface, a corresponding action is graphically depicted in the graphical interface portion. By providing a blend of a graphical interface and a command-line interface, embodiments of the invention provide improved usability of the virtual infrastructure client and allow novice users to more quickly become familiar with the use of the application. For example, as a user uses the application, the user can use more of the command-line as they become more comfortable.

Figure 2:
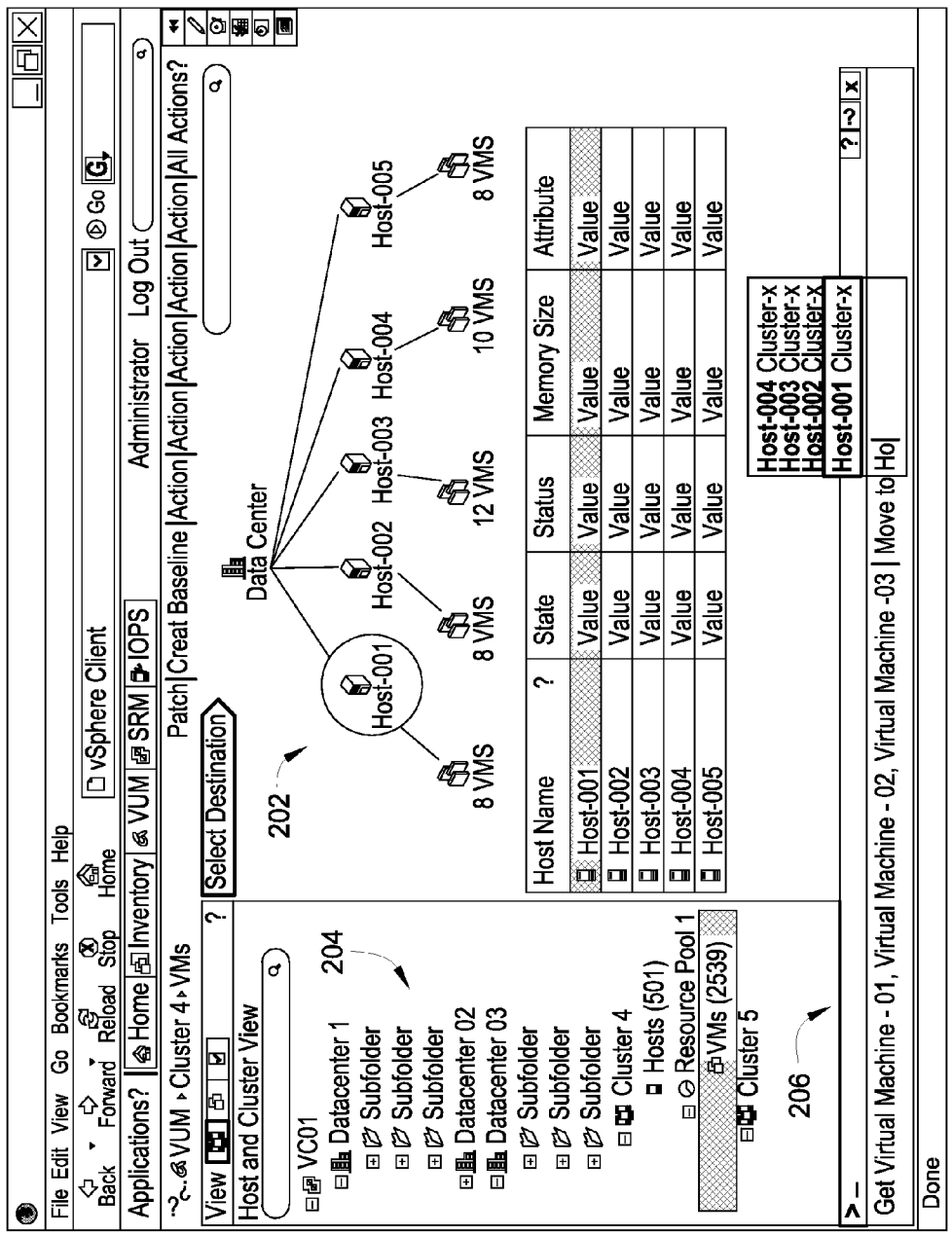
FIG. 2 depicts a user interface for a virtual infrastructure client, according to one embodiment of the invention.

FIG. 2 depicts a user interface for a virtual infrastructure client, according to one embodiment of the invention. As shown, the user interface includes a hierarchical view of the virtualized computing environment. A visual hierarchy 202 illustrates a data center at the root of the hierarchy. The data center includes one or more host computers, such as the host computer 104 shown in FIG. 1B. A collection of host computers can further be categorized as a "cluster" (not shown). Each host computer can run multiple virtual machines (VMs).

In addition, the visual hierarchy 202 can also be depicted textually as a textual hierarchy 204. The virtualized computing environment can be organized and managed graphically by a user interacting with either the visual hierarchy 202 and/or the textual hierarchy 204. According to some embodiments, interacting with a graphical interface is easier for a novice user and provides good visual feedback. For example, some users prefer to view the network topology while managing the VMs and host computers included in the virtual infrastructure. A graphical interface, such as the visual hierarchy 202 or the textual hierarchy 204, can be the best way to view the virtual topology. However, sometimes the speed at which a user can interact with a graphical interface can be slow. In addition, as described above, the user is limited by the functionality exposed by the GUI.

Accordingly, a command-line interface (CLI) 206 is also included in the user interface. A user can type in commands into the CLI 206 to manage the virtualized computing environment. A CLI 206 can provide a very fast and efficient way of managing the virtualized computing environment. Also, the entire API of the VI client application is exposed through the command line. However, managing the virtualized computing environment through the command line can be difficult to learn and can be risky. The powerful access provided by the command line interface can lead to the user making inadvertent errors, which can be very detrimental to the virtualized computing environment.

As described in greater detail herein, embodiments of the invention provide a blend of the graphical and command line user interfaces. As a user interacts with the graphical interface portion, a command-line entry corresponding to the interaction is automatically generated and populates the CLI 206. Similarly, as the user types in a command-line entry, a corresponding action is graphically depicted in the graphical interface portion. By providing a blend of a graphical interface and a command-line interface, embodiments of the invention provide improved usability of the virtual infrastructure client and allow novice users to more quickly become familiar with the use of the application.

Figure 3:
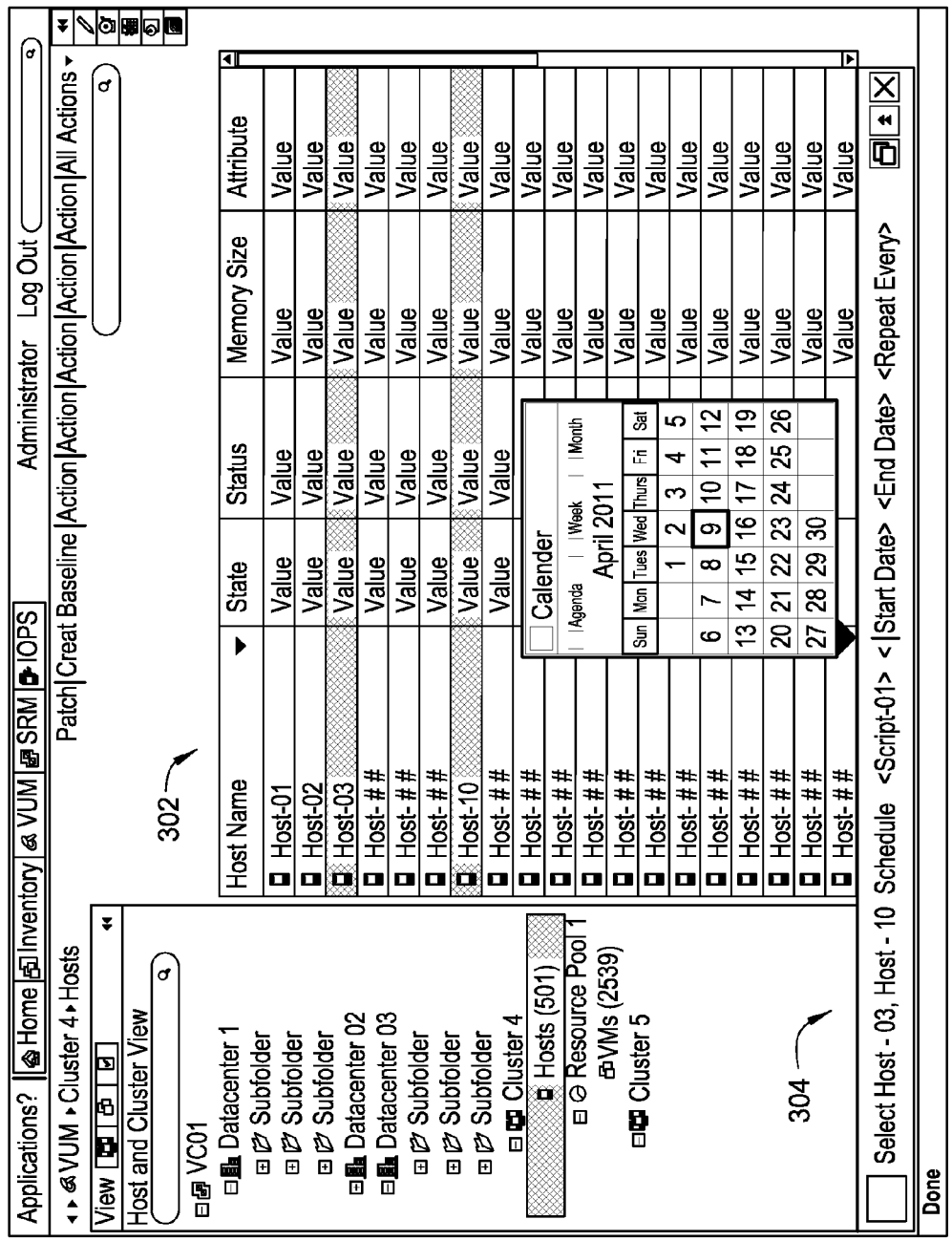
FIG. 3 depicts a user interface for a virtual infrastructure client with command-line integration, according to one embodiment of the invention.

FIG. 3 depicts a user interface for a virtual infrastructure client with command-line integration, according to one embodiment of the invention. The user interface includes a list view 302 of one or more hosts included in the virtualized computing environment. The user interface also includes a CLI 304. In the example shown in FIG. 3, a user is typing a command into the CLI 304. The user has typed in a portion of a command that interacts with "Host-03" and "Host-10." In response to typing in the portion of the command, the VI client application provides GUI feedback corresponding to the command. As shown, Host-03 and Host-10 become highlighted in the list view 302. The GUI feedback provided by the VI client application allows the user to get a better understanding of what the command being entered is accomplishing.

As further shown in FIG. 3, the user continues to type in the command to schedule the execution of a script, "Script-01." In some embodiments, names of parameters associated with commands can be automatically displayed in the CLI 304. This gives the user visual assistance when entering the command. For example, "<Start Date>" is a parameter of script scheduling. As shown, a calendar can be displayed that allows the user to select a start date for the scheduled script. Automatically displaying parameter names and automatically displaying a GUI for entering parameter values is another way in which embodiments of the invention integrate the graphical interface with the command line interface. The calendar widget shown in FIG. 3 is merely exemplary. As described, the command line interface can be "dangerous" or difficult to use because users may inadvertently cause unexpected results in the virtualized computing environment. Blending GUI widgets into the CLI 304 offers the users some scaffolding. For example, only appropriate options can be suggested to the user, e.g., in a drop down menu, or in a calendar widget. In some embodiments, the user interface can automatically suggest a recommended default value that the use can use or modify.

Figure 4:
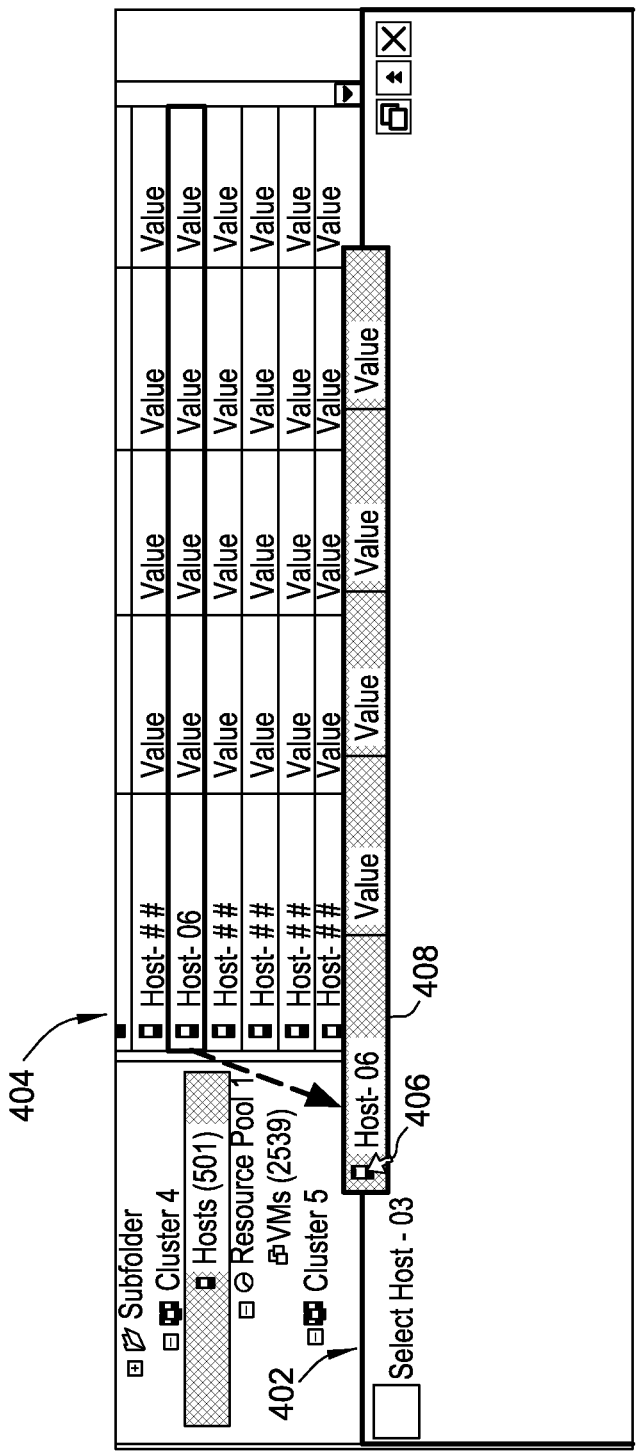
FIG. 4 depicts a user interface for a virtual infrastructure client with drag-and-drop command-line integration, according to one embodiment of the invention.

FIG. 4 depicts a user interface for a virtual infrastructure client with drag-and-drop command-line integration, according to one embodiment of the invention. The user interface includes a CLI 402 and graphical list view 404. Rather than requiring the user to manually type in the command with keystrokes, embodiments of the invention allow users to drag-and-drop objects from a graphical portion of the user interface, such as the graphical list view 404, to the CLI 402. As shown, the user has clicked on Host-06 in the graphical list view 404 with a mouse cursor 406 and has dragged a visual indication 408 associated with Host-06 into the CLI 402. Providing drag-and-drop functionality is yet another way in which embodiments of the invention integrate the graphical interface with the command line interface.

Figure 5:
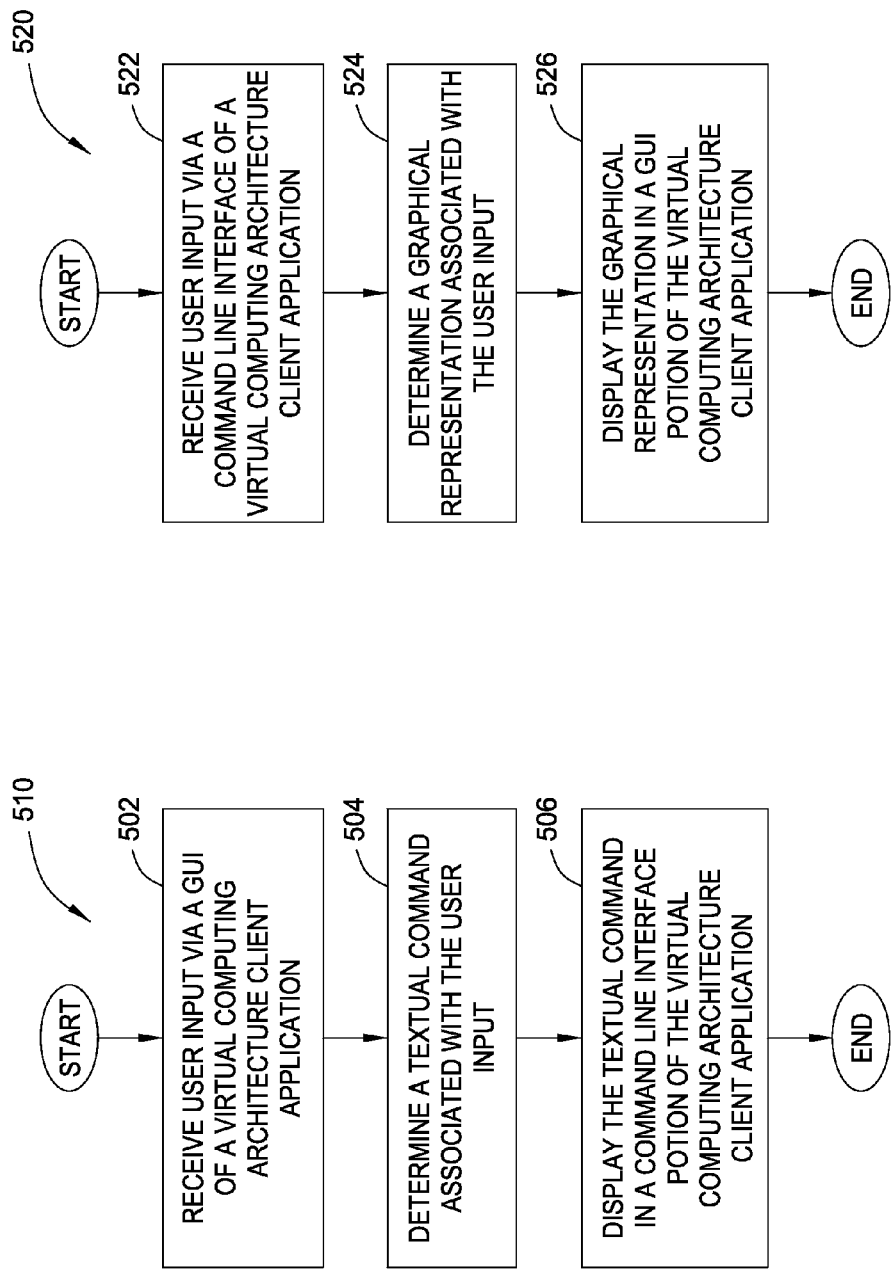
FIGS. 5A-5B are flow diagrams of method steps for displaying a user interface that integrates a graphical portion and a command line portion of the user interface, according to embodiments of the invention.

FIG. 5A is a flow diagram of method steps for displaying a user interface that integrates a graphical portion and a command line portion of the user interface, according to one embodiment of the invention. Persons skilled in the art would understand that, even though the method 510 is described in conjunction with the systems of FIGS. 1A-4, any system configured to perform the method steps, in any order, is within the scope of embodiments of the invention.

As shown, the method 510 begins at step 502, where a processing unit, such as the processing unit that executes the VI client 106, receives a user input via a graphical user interface. As described in relation to FIGS. 2 and 3, the graphical user interface may include a visual hierarchy, a textual hierarchy, or a list view associated with one or more virtual machines executing on one or more host computers in a virtualized computing environment.

An example of user input received via a graphical user interface includes receiving a mouse click on one or more objects in the graphical user interface, i.e., to select the one or more objects. Another example includes clicking on an object and dragging the object to another location in the graphical user interface. For example, a first VM can be executing on a first host computer. The user may wish to migrate the first VM from the first host computer to a second host computer. The first VM can be visually depicted as executing on the first host computer in a visual hierarchy such as the visual hierarchy 202 shown in FIG. 2. To accomplish the task of migrating the first VM the first host computer to the second host computer, the user may click on an object representing the first VM and drag the object to another portion of the visual hierarchy. In some embodiments, the user interface can display only technically feasible or recommended destinations for such a VM migration. In another embodiment, the VI client can include a graphical user interface that allows a user manually migrate a disk images of a virtual machine between storage arrays, as described in FIG. 1B.

At step 504, the VI client determines a textual command associated with the user input. Textual commands are commands that can be manually entered by a user into a command line interface (CLI). Continuing with the example above, a textual command associated with the user input for migrating the first VM may be "Get VM1 Move VM1 to Host-02."

At step 506, the VI client displays the textual command in a command line interface (CLI) portion of the user interface of the VI client. For example, when the user clicks on the first VM in the graphical user interface, the command snippet "Get VM1" is automatically populated in the CLI. As the user drags the first VM in the graphical user interface, the command snippet "Move" is populated in the CLI. When the user positions the object representing the first VM over an object representing the second host computer, the CLI is populated with the command snippet "VM1 to Host-02."

Accordingly, the user can explore and learn the interface of the VI client through the GUI, where the actions are also reflected as equivalent text commands in the command-line interface. Embodiments of the invention allow the users to learn the command line technique by performing graphical actions.

FIG. 5B is a flow diagram of method steps for displaying a user interface that integrates a graphical portion and a command line portion of the user interface, according to one embodiment of the invention. Persons skilled in the art would understand that, even though the method 520 is described in conjunction with the systems of FIGS. 1A-4, any system configured to perform the method steps, in any order, is within the scope of embodiments of the invention.

As shown, the method 520 begins at step 522, where a processing unit, such as the processing unit that executes the VI client 106, receives a user input via a command-line interface (CLI). As described above, a command line interface can be used to manage the one or more VMs executing on the one or more hosts in the virtualized computing environment. In some embodiments, the CLI is used to make bulk modifications to a large number of objects or VMs.

At step 524, the VI client determines a graphical representation of the user input received via the CLI. At step 526, the VI client displays the graphical representation of the user input in a graphical user interface. Examples of graphical representations that can be displayed include highlighting selected VMs or hosts, moving VMs or hosts in the hierarchy, modifying the attributes of a VM or host displayed in a list view, or any other technically feasible graphical representation.

Figure 6:
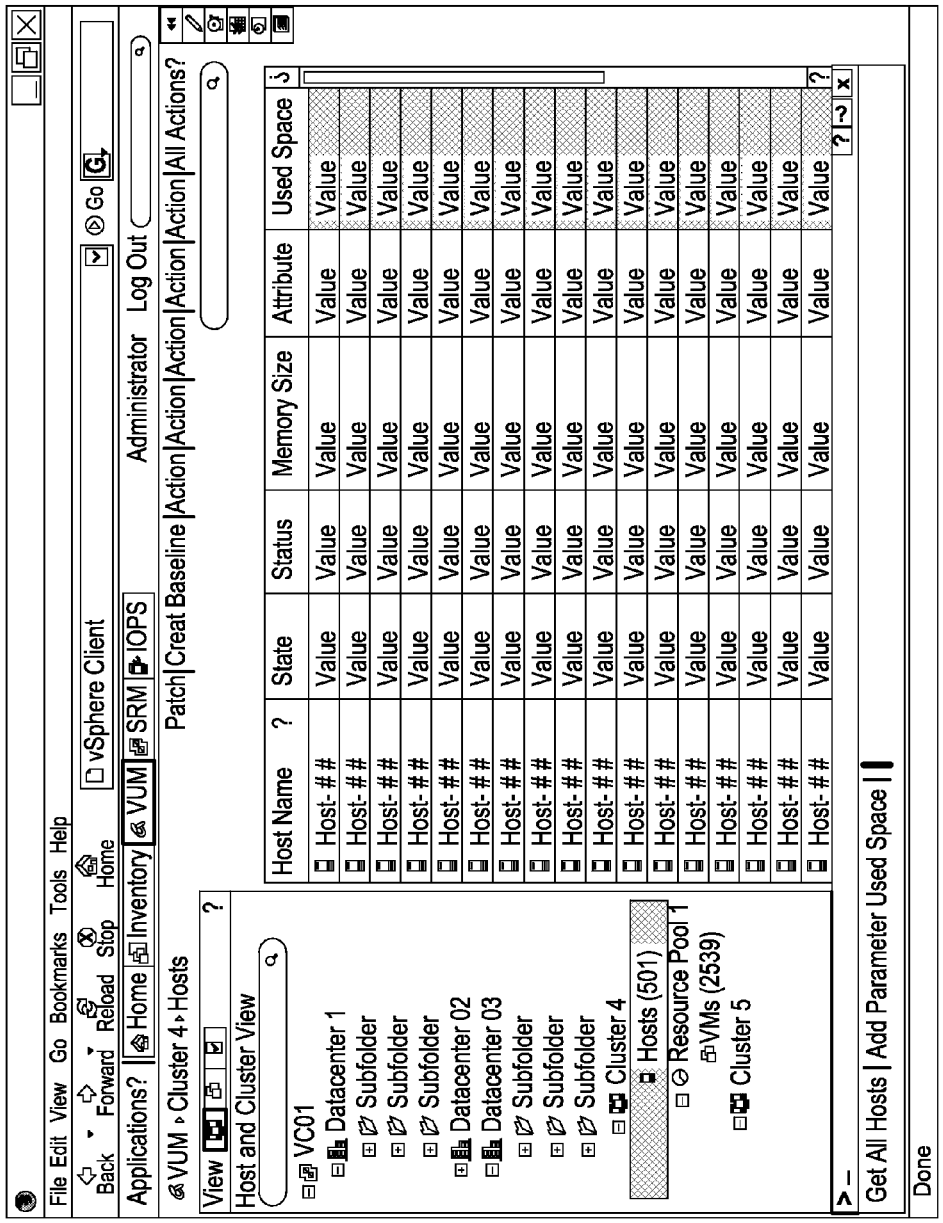
FIG. 6 depicts adding a column to a list view via the command line interface, according to one embodiment of the invention.

Another embodiment of the invention involves changing the view in the graphical user interface via the command line. FIG. 6 depicts adding a column to a list view via the command line interface, according to one embodiment of the invention. As shown, the user has typed in the command "Get All Hosts I Add Parameter Used Space." The VI client parses the command and determines that, in response, an additional column should be included in the list view shown in the graphical portion of the user interface. The "Used Space" column can be automatically populated with the parameter values associated with each host.

Figure 7A:
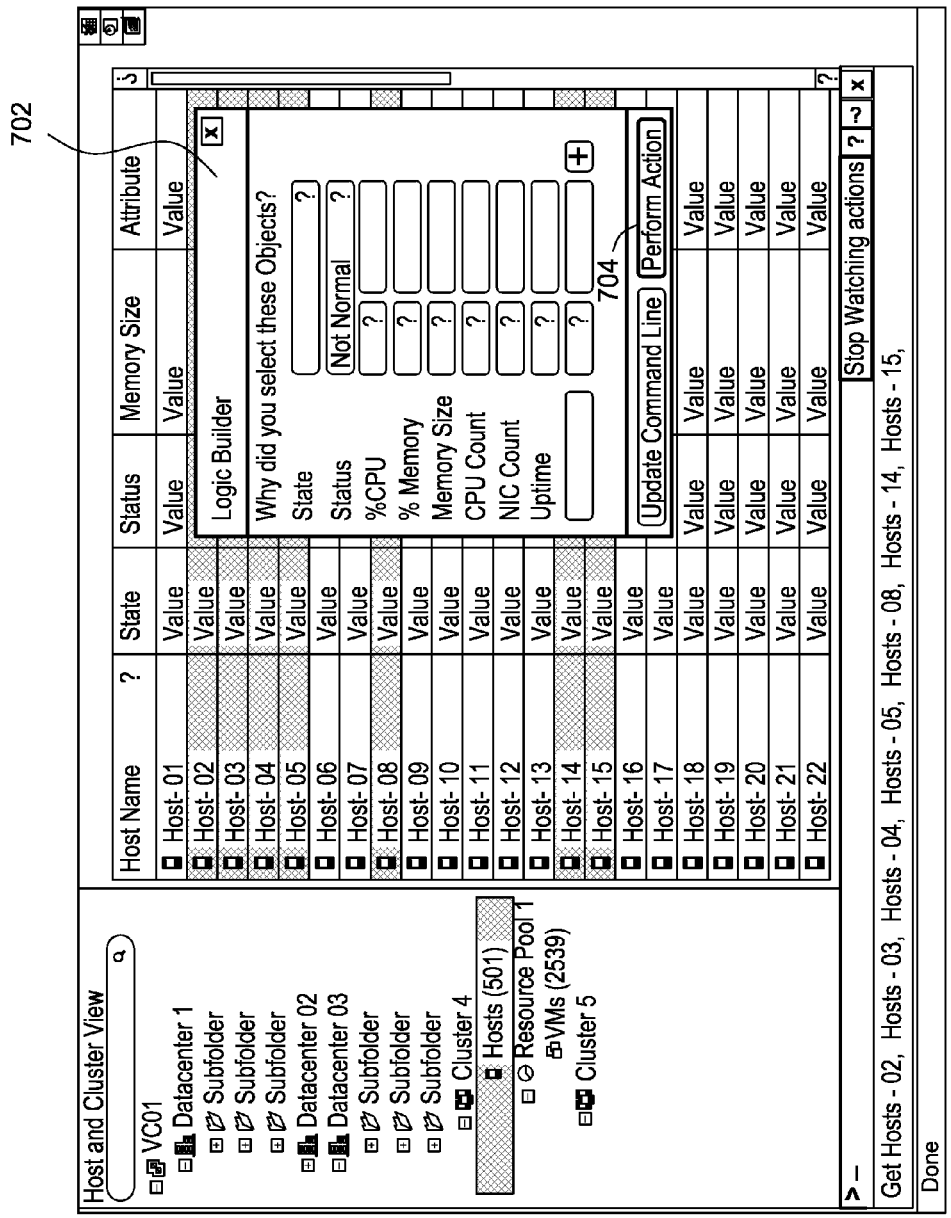
Figure 7B:
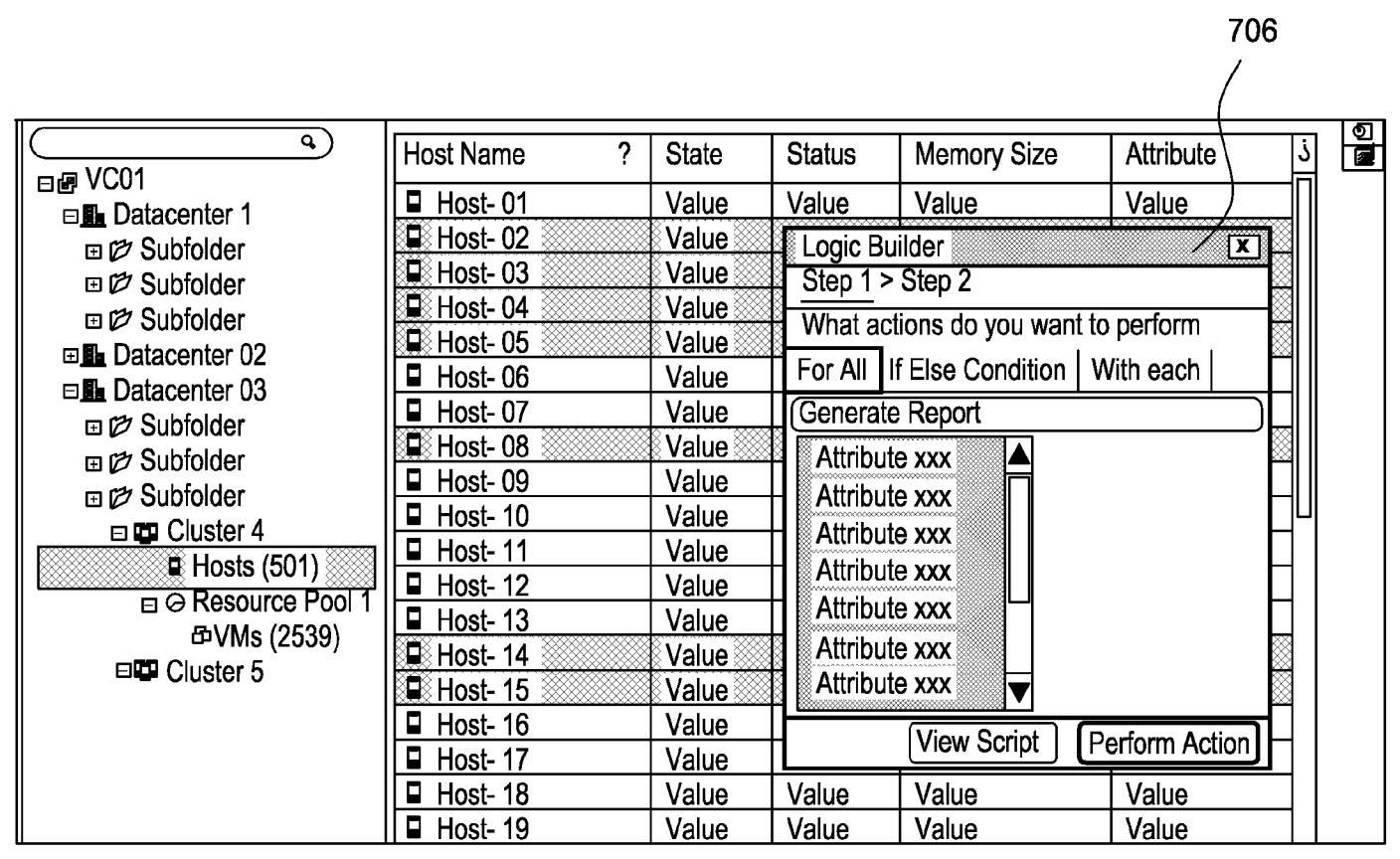
Figure 7C:
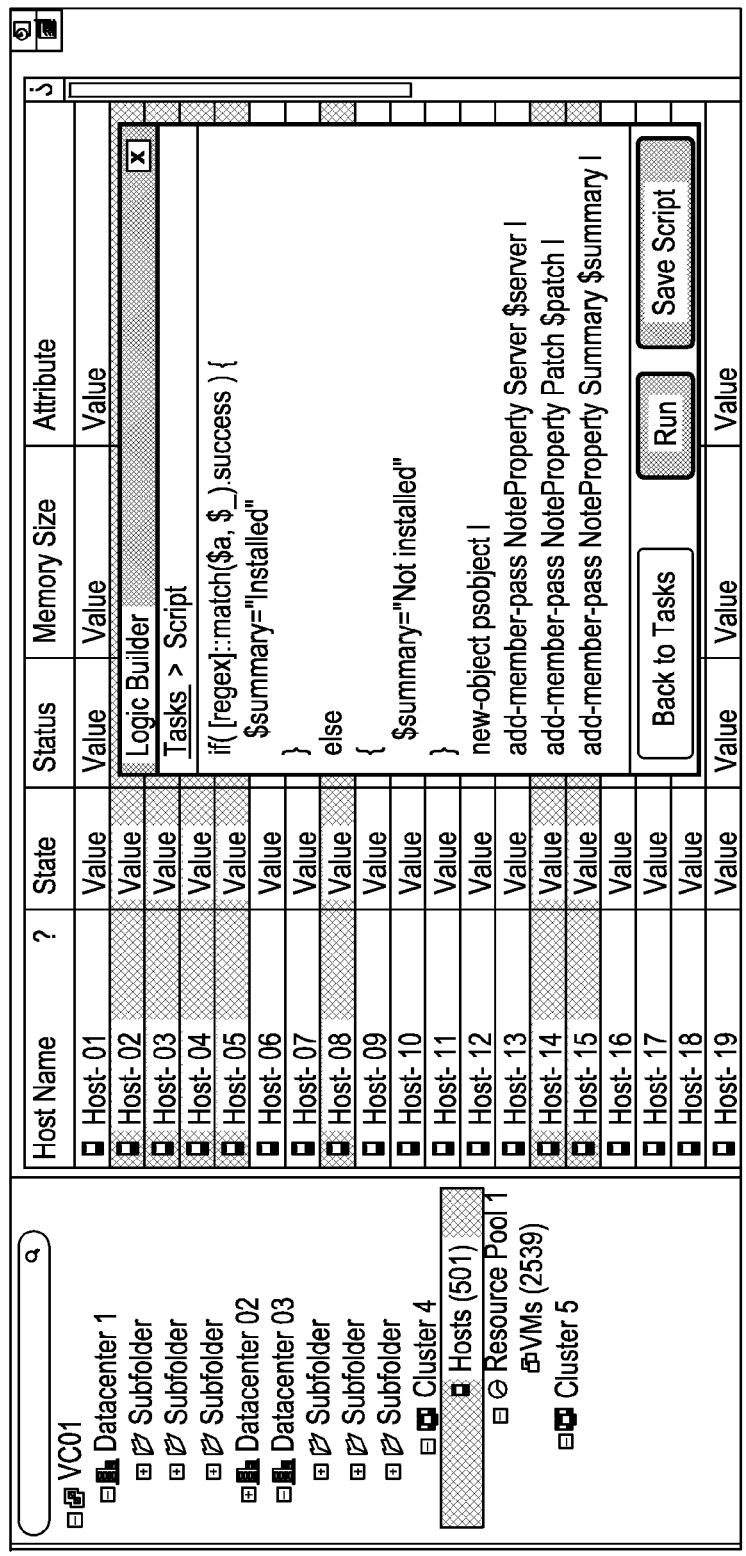

Yet another embodiment of the invention involves a "logic builder" that can automatically provide suggestions or "guess" what action the user is attempting to perform. FIGS. 7A-7C depict screenshots of a logic builder, according to embodiments of the invention. As shown in FIG. 7A, a user has selected six hosts on which to perform some action. The selected hosts are illustrated with highlighting and are also listed in the command line interface. According to various embodiments, the hosts could have been selected via the graphical interface and/or the command line interface.

Also shown in FIG. 7A is a window 702 that prompts the user to indicate why the user has selected the particular objects currently selected, i.e., the six selected hosts. As shown, the user has indicated that the six hosts are selected by their common status is "Not Normal." Once the user has indicated the reason for selecting the particular selected objects, the user can press the Perform Action button 704 to associate an action with the selection of objects.

FIG. 7B illustrates a window 706 that allows the user to select an action to perform on the selected objects. The user can create custom actions with an if-then-else clause or may choose to apply the action to each selected object. FIG. 7C illustrates an equivalent script to the logic associated with the selection of particular items and the actions to be performed onto those selected items. The script can be saved and reused to perform future actions. Also, now that the logic builder has "learned" about this particular logic function, the VI client can anticipate the actions that the user is intending to perform based on a small amount of user input. The next time the user selects an object that satisfies the logic function or begins typing a command that satisfies the function, the VI client suggests the action associated with the logic function. The user can confirm the suggestion or may edit the suggestion to perform a modified version of the action. In some embodiments, the suggested action may be based on a role that a particular user has within the virtual environment. For example, the suggestions provided to a senior administrator may be different than the suggestion provided to a junior administrator.

As described above, some embodiments of the invention relate to integrating graphical interactions with command line interactions. Command line interactions, however, are sometimes used for relatively minor actions associated with managing the virtualized computer environment. When larger or more complex actions are to be performed, users typically rely on scripts. A script is a collection of command line actions.

Figure 8A:
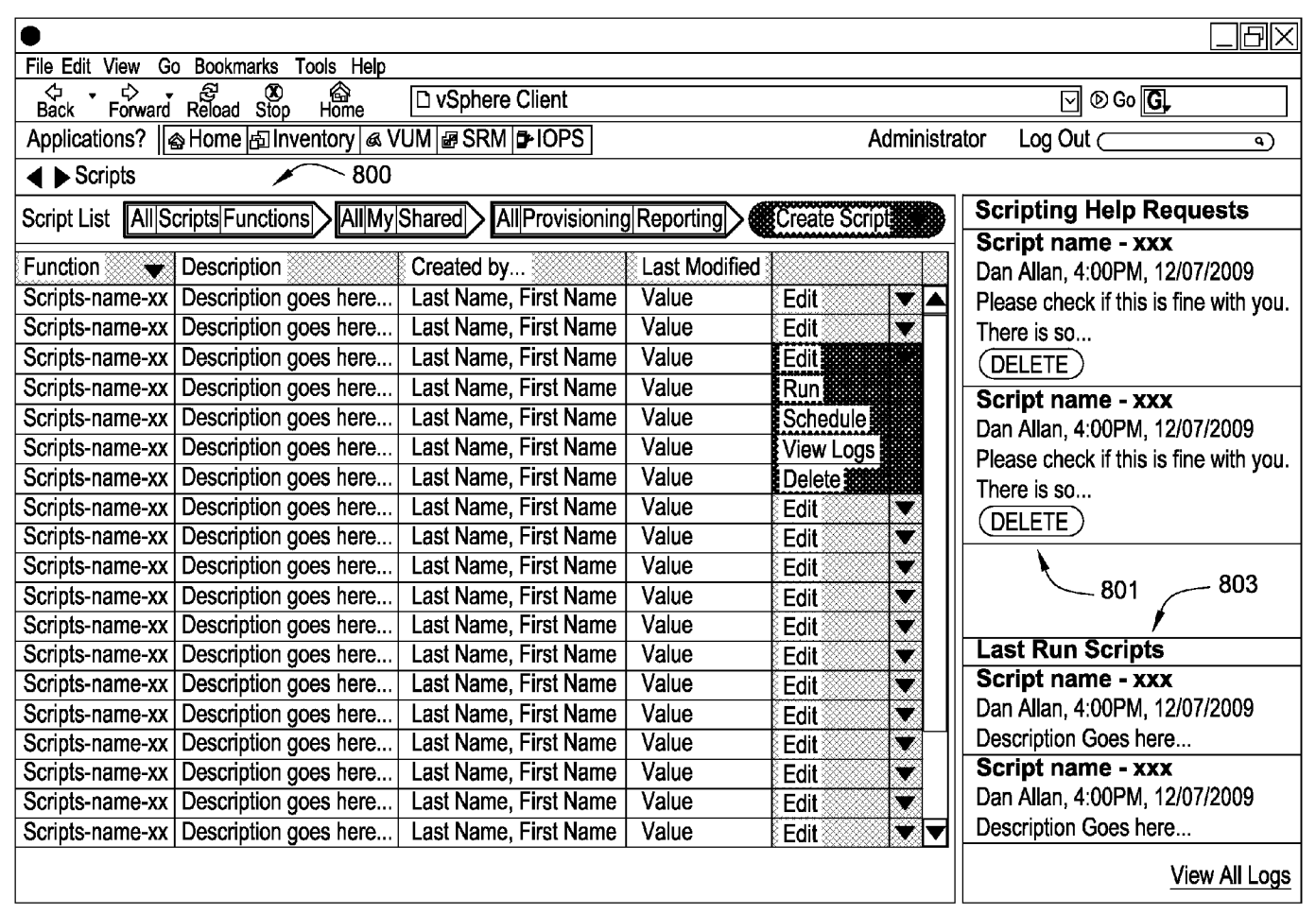

FIG. 8A illustrates a script listing user interface, according to one embodiment of the invention. A script list 800 is shown in the user interface. In some embodiments, the user interface can also include a social networking portion 801. The social networking portion allows users to communicate with other users regarding the use of scripts. For example, one user may be considered an expert user. Other users can interact with the social networking portion 801 to pose questions to the expert user. Users can also post comments or notes about particular scripts. Also shown in the user interface is a last run scripts portion 803. The last run scripts portion 803 allows the user the ability to see the last scripts that were run. This feature can be useful for audit trail purposes.

Figure 8B:
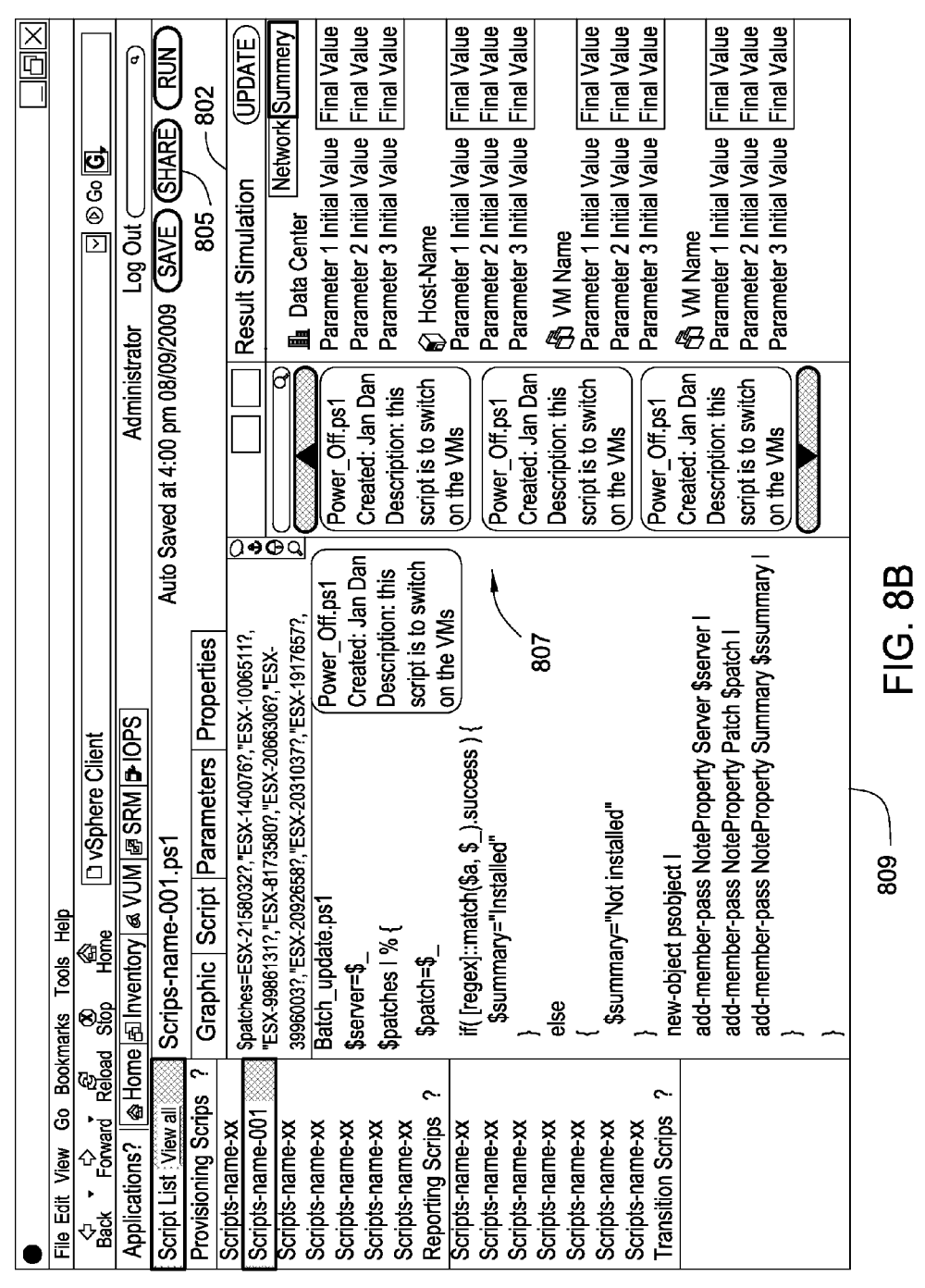

FIG. 8B illustrates a script editor, according to one embodiment of the invention. A user can write a script by building the script out of script functions 807. Some users may be wary of writing scripts because they do not know what the results would be of running a particular script or script function. Script functions 807 are approved, tested for correctness, and can be reused when writing new scripts. The script functions 807 can be dragged into the left pane 809 as part of the construction of a new script.

Some embodiments of the invention provide a simulation of executing the script, and the results of the simulation can be displayed in the user interface. As shown in FIG. 8B, the simulation results are displayed in window 802. The simulation results depict what would happen if the script was run, including which objects or environments change and how they change. This provides the user with a preview, to minimize destructive command execution by showing and/or warning the user what would happen if the script was run. A user can review the simulation results and can modify the script when the simulation returns unexpected results. In some embodiments, a user can also share a script using a share link 805. This social networking aspect allows the user to publicize a script when the script is ready for the rest of the team.

Figure 8C:
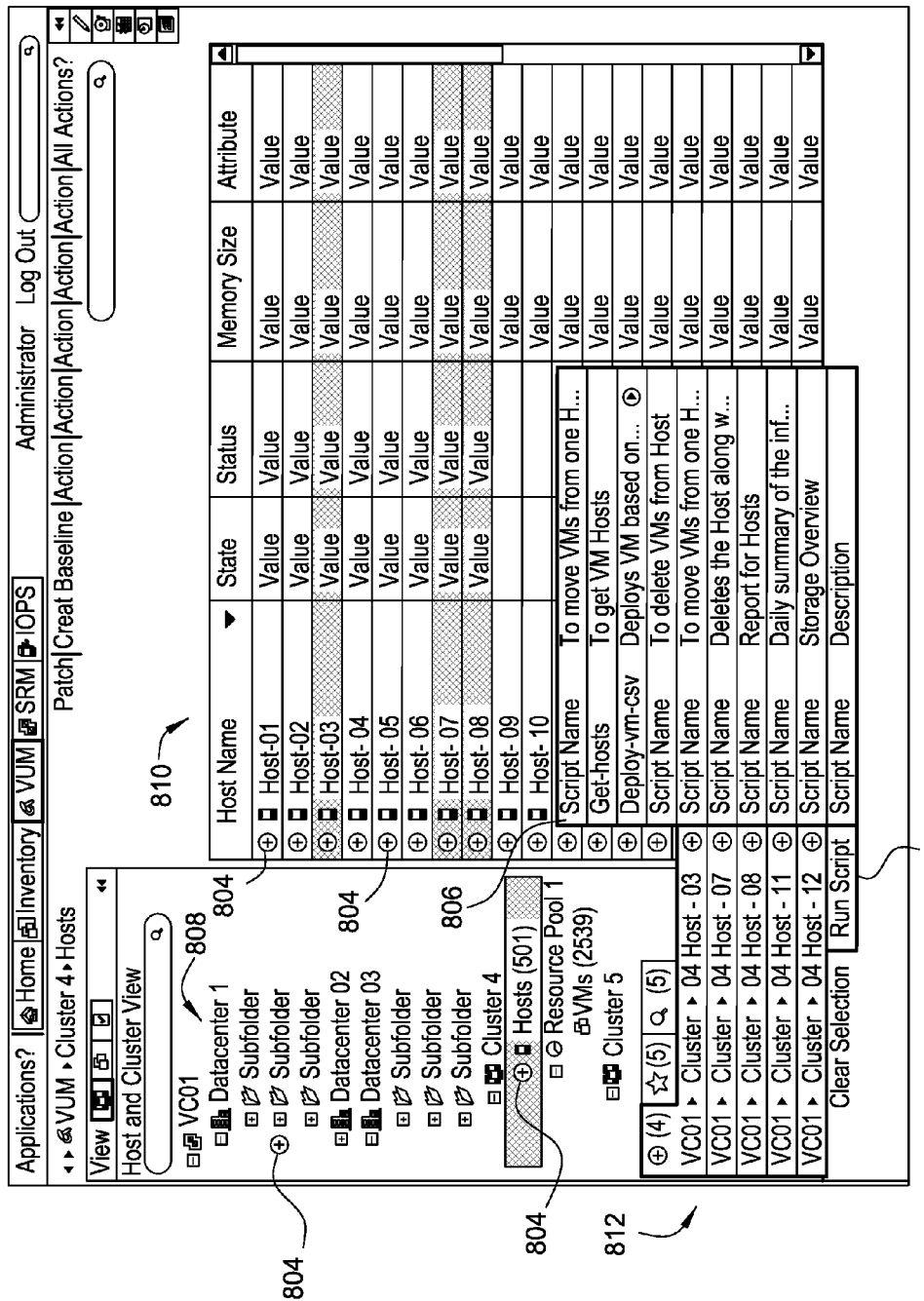

FIG. 8C illustrates calling a script from a graphical interface, according to one embodiment of the invention. As shown, the virtualized computing environment is depicted in a textual hierarchy 808 as well as a list view 810. A user can select objects from the textual hierarchy 808 and/or the list view 810 by clicking on "+" icon next to selectable objects. The selected objects can be saved into a basket 812. The user can then run a script on one or more of the objects included in the basket 812 of selected objects.

In one embodiment, the user can launch a script selection window 806 by right-clicking on an object and/or selecting a run script button 814. After a script is selected, one or more additional windows may be displayed in which a user is prompted to enter values of one or more script parameters.

In sum, embodiments of the invention provide techniques for integrating a graphical interface with a command line and/or scripting interface. As a user interacts with the graphical interface portion, a command-line entry corresponding to the interaction is automatically generated and populates the command-line portion. Similarly, as the user types in a command-line entry, a corresponding action is graphically depicted in the graphical interface portion.

Additional embodiments of the invention relate to a logic builder and integrated script editor and launcher. The logic builder mechanism can learn the tasks that the user is likely to be perform and can, in the future, anticipate that the user is attempting to perform those tasks again. The integrated script editor and launcher allows users to write scripts in an integrated interface and launch the scripts from the graphical interface.

Advantageously, embodiments of the invention make it easier for users to learn commands and reduce the entry barrier to scripting and command-line entry for beginners. For example, novice users will be able to see equivalent commands for their actions on in the graphical interface and then be able to learn and use them effectively. Additionally, since the graphical interface and the command-line interface are included in the same window, the integrated interface is less cluttered compared to using two or more windows.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for managing computing resources in a virtualized computing environment, comprising:
   receiving non-keyboard user input via a graphical interface of a virtual infrastructure management application configured to manage the virtualized computing environment having one or more host computers and one or more virtual machines executing on each of the one or more host computers;
   determining a textual command that is one of a plurality of textual commands of an application programming interface (API) of the virtual infrastructure management application, the textual command executable by the virtual infrastructure management application to perform action equivalent to the non-keyboard user input received via the graphical interface; and
   displaying the textual command in a command line interface of the virtual infrastructure management application, wherein the textual command is executable within the command line interface.

2. The method of claim 1, wherein the graphical interface comprises a hierarchical tree view of the virtualized computing environment that includes at least one of: the one or more host computers or the one or more virtual machines executing on each of the one or more host computers.

3. The method of claim 1, wherein the graphical interface comprises a list view of the virtualized computing environment that includes at least one of: the one or more host computers or the one or more virtual machines executing on each of the one or more host computers.

4. The method of claim 1, wherein the non keyboard user input comprises a user selection of one or more objects included in the graphical interface with a mouse click.

5. The method of claim 1, wherein the non keyboard user input comprises dragging an object included in the graphical interface into the command line interface, and displaying the textual command includes displaying text corresponding to said object in the command line interface.

6. The method of claim 1, further comprising:
   receiving, via the graphical interface of the virtual infrastructure management application, user input associated with executing a script, wherein the script includes one or more commands of the API;
   prompting a user to define one or more parameters associated with the script; and
   causing the script to be executed.

7. A non-transitory computer-readable storage medium comprising instructions that, when executed in a computing device, causes the computing device to carry out the steps of:
   receiving non-keyboard user input via a graphical interface of a virtual infrastructure management application configured to manage the virtualized computing environment having one or more host computers and one or more virtual machines executing on each of the one or more host computers;
   determining a textual command that is one of a plurality of textual commands of an application programming interface (API) of the virtual infrastructure management application, the textual command executable by the virtual infrastructure management application to perform action equivalent to the non-keyboard user input received via the graphical interface; and
   displaying the textual command in a command line interface of the virtual infrastructure management application, wherein the textual command is executable within the command line interface.

8. The non-transitory computer-readable storage medium of claim 7, wherein the graphical interface comprises a hierarchical tree view of the virtualized computing environment that includes at least one of: the one or more host computers or the one or more virtual machines executing on each of the one or more host computers.

9. The non-transitory computer-readable storage medium of claim 7, wherein the graphical interface comprises a list view of the virtualized computing environment that includes at least one of: the one or more host computers or the one or more virtual machines executing on each of the one or more host computers.

10. The non-transitory computer-readable storage medium of claim 7, wherein the non-keyboard user input comprises a user selection of one or more objects included in the graphical interface with a mouse click.

11. The non-transitory computer-readable storage medium of claim 7, wherein the non-keyboard user input comprises dragging an object included in the graphical interface into the command line interface, and displaying the textual command includes displaying text corresponding to said object in the command line interface.

12. The non-transitory computer-readable storage medium of claim 7, further comprising:
   receiving, via the graphical interface of the virtual infrastructure management application, user input associated with executing a script, wherein the script includes one or more commands of the API;
   prompting a user to define one or more parameters associated with the script; and
   causing the script to be executed.

* * * * *